(12) United States Patent
Huang et al.

(10) Patent No.: US 11,015,918 B2
(45) Date of Patent: May 25, 2021

(54) OPTICAL DISPLACEMENT SENSING SYSTEM

(71) Applicant: NATIONAL CHIAO TUNG UNIVERSITY, Hsinchu (TW)

(72) Inventors: Cheng-Sheng Huang, Hsinchu (TW); Yen-Chieh Wang, Hualien (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 16/600,158

(22) Filed: Oct. 11, 2019

(65) Prior Publication Data
US 2020/0116472 A1 Apr. 16, 2020

(30) Foreign Application Priority Data

Oct. 12, 2018 (TW) ................... 107135911

(51) Int. Cl.
| | | |
|---|---|---|
| *G01B 11/04* | (2006.01) | |
| *G01D 5/38* | (2006.01) | |
| *G01D 5/26* | (2006.01) | |
| *G02B 6/35* | (2006.01) | |
| *G02B 27/10* | (2006.01) | |

(52) U.S. Cl.
CPC ........... *G01B 11/043* (2013.01); *G01D 5/268* (2013.01); *G01D 5/38* (2013.01); *G02B 6/3534* (2013.01); *G02B 27/10* (2013.01)

(58) Field of Classification Search
CPC ........ G01B 11/043; G01D 5/38; G01D 5/268; G02B 6/3534; G02B 6/3624; G02B 27/10
See application file for complete search history.

(56) References Cited

U.S. PATENT DOCUMENTS

| | | | |
|---|---|---|---|
| 6,483,096 B1 * | 11/2002 | Kunz | ................. G01N 21/6428 250/214 R |
| 7,155,087 B2 | 12/2006 | Suh et al. | |
| | | (Continued) | |

OTHER PUBLICATIONS

Chun Ge et al., "External cavity laser biosensor", The Royal Society of Chemistry, vol. 13, No. 7, pp. 1247-1256, Apr. 7, 2013.*
(Continued)

*Primary Examiner* — Ryan A Lepisto
(74) *Attorney, Agent, or Firm* — Muncy, Geissler, Olds & Lowe, P.C.

(57) ABSTRACT

An optical displacement sensing system is provided. With configuration of an optical sensor disposed on a displacement platform and in cooperation with a broadband light source and an optical spectrum analyzer, when the displacement platform moves, the waveguide grating of the optical sensor is resonated and the reflected light provided with a resonance wavelength is formed. The waveguide grating has the plurality of grating periods, and when the displacement platform moves to a different position to make the broadband light source correspond to a different grating period, the position can correspond to the different resonance wavelength. Therefore, according to the aforementioned configuration, the position is determined according to the different resonance wavelength, instead of using an optical encoder; furthermore, the micrometer-scale or nanometer-scale displacement detection is achieved.

8 Claims, 13 Drawing Sheets

(56) References Cited

U.S. PATENT DOCUMENTS

| | | | | |
|---|---|---|---|---|
| 8,619,260 | B2* | 12/2013 | Matejka | G01N 21/276 |
| | | | | 356/448 |
| 10,012,535 | B2* | 7/2018 | Huang | G01J 3/1804 |
| 10,211,596 | B2* | 2/2019 | Oh | G01J 3/0218 |
| 10,775,237 | B2* | 9/2020 | Huang | G01J 3/02 |
| 2010/0014073 | A1* | 1/2010 | Hashiguchi | G01N 21/55 |
| | | | | 356/128 |
| 2011/0116095 | A1* | 5/2011 | Krol | G01N 21/553 |
| | | | | 356/445 |
| 2013/0323858 | A1* | 12/2013 | Abdulhalim | G01N 21/554 |
| | | | | 436/501 |
| 2019/0234876 | A1* | 8/2019 | Huang | G01N 33/54326 |

OTHER PUBLICATIONS

Meng Zhang et al., "A self-referencing biosensor based upon a dual-mode external cavity laser", Applied Physics Letters, vol. 102, No. 1, p. 213701-1-213701-4, 2013.*

Meng Zhang et al., "Detection of Protein-Small Molecule Binding Using a Self-Referencing External Cavity Laser Biosensor", American Chemical Society, vol. 136, pp. 5840-5843, 2014.*

* cited by examiner

OPTICAL DISPLACEMENT SENSING SYSTEM

CROSS-REFERENCE TO RELATED APPLICATION

This application claims the benefit of Taiwan Patent Application No. 107135911, filed on Oct. 12, 2018, in the Taiwan Intellectual Property Office, the disclosure of which is incorporated herein in its entirety by reference.

BACKGROUND OF THE INVENTION

1. Field of the Invention

The present invention relates to an optical displacement sensing system, more particularly to an optical displacement sensing system which the reflected light with the resonance wavelength is generated when the incident light radiates on the waveguide grating during the movement of the displacement platform by means of the waveguide grating and the displacement platform.

2. Description of the Related Art

Conventional optical position sensing systems use a diffraction pattern of a grating structure to detect displacement. Specifically, a light source emits the incident light to an optical encoder with the grating structure and the diffraction patterns are formed. Different diffraction patterns are generated with the movement of the optical encoder. The conventional optical position sensing system distinguishes positions according to the difference between diffraction patterns. However, when the optical encoder suffers from the vibration, the diffraction patterns would change and the detection error of the position may be resulted. The conventional optical position sensing system requires high stability of the optical encoder.

U.S. Pat. No. 7,155,087B2 discloses a system using two parallel arrays constituted of air holes to detect a change in displacement. Specifically, the incident light is incident on the two arrays and passes through the two arrays to obtain an original light transmission spectrum. When the distance between the two arrays is changed, the original light transmission spectrum is changed to a varied light transmission spectrum, so that a displacement can be determined according to the change between the original light transmission spectrum and the varied light transmission spectrum. However, the incident light must be coupled to the arrays constituted of air holes and the arrays are resonated, the polarization state of the incident light and the environmental for the incident light must be properly selected. Furthermore, the two arrays constituted of air holes also elongate length of the displacement sensing system.

In order to solve above problems, the inventors of the present invention develop an optical displacement sensing system.

SUMMARY OF THE INVENTION

An objective of the present invention is to provide an optical displacement sensing system, to solve the above-mentioned problems.

In order to achieve the objective, the present invention provides an optical displacement sensing system comprising a broadband light source, a fiber collimator, an optical sensor, a displacement platform and an optical spectrum analyzer. The broadband light source is configured to emit an incident light. The fiber collimator includes an input terminal, a sensing terminal and an output terminal; and the input terminal is coupled to the broadband light source and configured to receive the incident light, and the sensing terminal is configured to transmit the incident light. The optical sensor is disposed adjacent to the sensing terminal and on a travelling path of the incident light, and configured to receive the incident light. The optical sensor comprises a substrate and a waveguide grating. The waveguide grating includes a plurality of grating periods different from each other and disposed on the substrate. The waveguide grating is configured to be resonated by the received incident light, and to form a reflected light with a resonance wavelength and emitted to the sensing terminal. The displacement platform is disposed adjacent to the optical sensor and on the travelling path of the incident light. The displacement platform is moved to a plurality of different positions corresponding to a plurality of different grating periods, so that the plurality of different positions correspond to different ones of the resonance wavelength of the plurality of different grating periods. The optical spectrum analyzer is coupled to the output terminal to display a spectrum of the reflected light. By means of foregoing configuration, each position is distinguishable based on the different resonance wavelength and there is no need for optical encoder and the incident light with specific phase. Besides, in the optical displacement sensing system of the present invention, the needed element is easy to obtain at low cost. The length of the present invention is shorter than that of the conventional optical position sensing system, and advantageously, the present invention is not sensitive to electromagnetic interferences.

Preferably, the substrate is located on a side away from the fiber collimator or close to the fiber collimator.

Preferably, the waveguide grating comprises a grating structure and a waveguide layer, the grating structure is disposed on the substrate, and the waveguide layer is disposed on the grating structure.

Preferably, the waveguide grating includes a plurality of first refractive index regions and a plurality of second refractive index region alternately disposed thereon, and the refractive index of the first refractive index regions is higher than that of the second refractive index of the second refractive index regions.

Preferably, a displacement between the positions is in the micrometer scale.

Preferably, the optical displacement sensing system further comprises a polarizer disposed between the optical sensor and the sensing terminal to polarize the incident light.

Preferably, the plurality of grating periods comprises a maximal grating period and a minimal grating period, a variation from the minimal grating period to the maximal grating period is gradient.

Preferably, the displacement platform is moved based on a reference point which is a position corresponding to the minimal grating period.

In order to achieve the objective, the present invention provides an optical displacement sensing system comprising an optical amplifier, a first fiber collimator, a second fiber collimator, an incident mirror, an optical sensor, a reflector and a displacement platform. The optical amplifier comprises an incident terminal, and a reflection terminal. The incident terminal is configured to emit an incident light. The first fiber collimator is coupled to the incident terminal, and the second fiber collimator is coupled to the reflection terminal. The incident mirror is disposed on a side of the first fiber collimator opposite to the incident terminal, and configured to change a direction of the incident light. The optical sensor is disposed adjacent to the incident mirror and on the travelling path of the incident light, and configured to receive the incident light. The optical sensor comprises a substrate and a waveguide grating. The waveguide grating is provided with a plurality of grating periods different from each other and disposed on the substrate. The waveguide grating is configured to receive the incident light and reflect a reflected light to the incident mirror, and the incident mirror reflects the reflected light to the first fiber collimator. The reflector is disposed on a side of the second fiber collimator opposite to the reflection terminal, and configured to receive the reflected light from the second fiber collimator, and reflect the reflected light to the second fiber collimator, so as to reflect the reflected light to the optical sensor. The reflected light is travelled back and forth between the optical sensor and the reflector to achieve a lasing condition for generating a laser beam. The displacement platform is disposed adjacent to the optical sensor and on the travelling path of the incident light. When the laser beam is incident on the incident mirror through the first fiber collimator, the laser beam is then incident on the optical sensor to make the waveguide grating of the optical sensor resonate, and the reflected laser beam with a resonance wavelength is reflected from the waveguide grating. The displacement platform is moved to the plurality of different positions corresponding to a plurality of different grating period, so that the plurality of different positions correspond to different ones of the resonance wavelength of the plurality of different grating periods. Due to the coherence of the laser beam and the plurality of the waveguide grating with different grating periods, each different resonance wavelength corresponds to the different position, and the full width at half maximum of each resonance wavelength is narrow. Therefore, each position is easy to distinguish.

Preferably, the substrate is located on a side away from or close to the incident mirror.

Preferably, the waveguide grating comprises a grating structure and a waveguide layer, the grating structure is disposed on the substrate, and the waveguide layer is disposed on the grating structure.

Preferably, the waveguide grating comprises a plurality of first refractive index regions and a plurality of second refractive index regions alternately disposed thereon, and the refractive index of the first refractive index regions is higher than that of the second refractive index of the second refractive index regions.

Preferably, a displacement between the positions is nanometer scale.

Preferably, the optical displacement sensing system further comprises a beam splitter and an optical spectrum analyzer. The beam splitter is located between the reflector and the second fiber collimator, and the beam splitter redirects the reflected laser beam to the optical spectrum analyzer.

Preferably, the plurality of grating periods comprise a maximal grating period and a minimal grating period, a variation from the minimal grating period to the maximal grating period is gradient.

Preferably, the displacement platform is moved based on a reference point which is the position corresponding to the minimal grating period.

According to above-mentioned contents, the optical displacement sensing system of the present invention has at least one of the following advantages:

First, the optical displacement sensing system of the present invention can use the grating structure to obtain the reflected light with a preferred resonance wavelength, so as to distinguish different positions according to different resonance wavelengths, instead of using an optical encoder and the incident light with a specific phase, thereby achieving micrometer-scale or nanometer-scale displacement detection.

Secondly, the components of the optical displacement sensing system of the present invention can be obtained easily and at low-cost and the optical displacement sensing system is insensitive to electromagnetic interferences.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
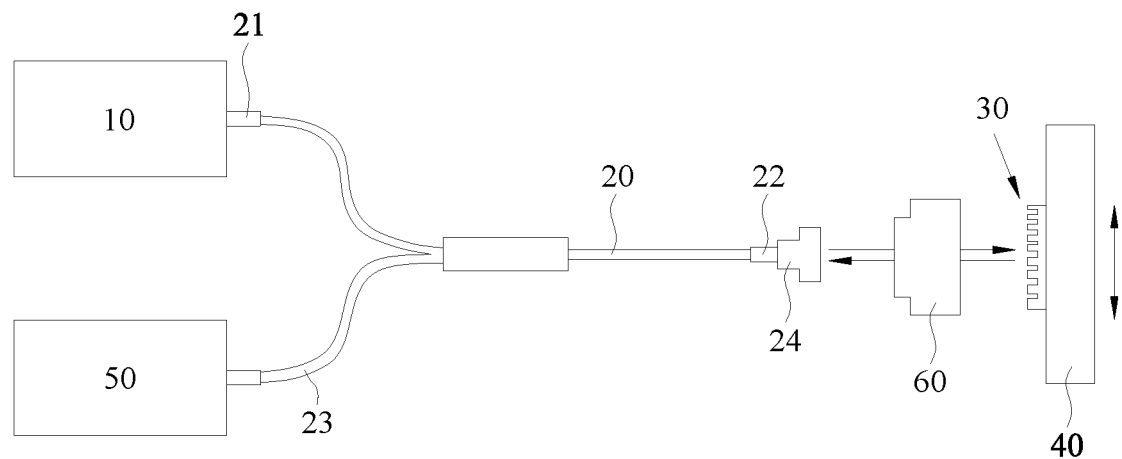
FIG. 1 is a configuration diagram of a first embodiment of an optical displacement sensing system of the present invention.

The following embodiments of the present invention are herein described in detail with reference to the accompanying drawings. These drawings show specific examples of the embodiments of the present invention. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

Please refer to FIG. 1, which is a configuration diagram of the first embodiment of an optical displacement sensing system of the present invention. In this embodiment, the optical displacement sensing system of the present invention includes a broadband light source 10, a fiber collimator 20, an optical sensor 30, a displacement platform 40 and an optical spectrum analyzer 50. The broadband light source 10 emits an incident light. The fiber collimator 20 may be a 2×1 fiber module, and comprise an input terminal 21, a sensing terminal 22, an output terminal 23 and a collimator 24. The input terminal 21 is coupled to the broadband light source 10 to receive the incident light, the collimator 24 is disposed on the sensing terminal 22, and the sensing terminal 22 transmits the incident light. The incident light passes through the collimator 24 and travels toward the optical sensor 30. The optical sensor 30 is disposed adjacent to the sensing terminal 22, and disposed on a travelling path of the incident light for receiving the incident light. The optical sensor 30 includes a substrate 31 and a waveguide grating WG. The waveguide grating WG includes a waveguide layer 33 and a grating structure 32. The grating structure 32 has a plurality of grating periods $P_1$ to $P_n$ different from each other and the grating structure 32 is disposed on the substrate 31. The waveguide layer 33 is disposed on the grating structure 32. By receiving the incident light by the waveguide grating WG, the waveguide grating WG is resonated by the received light to reflect the reflected light with a resonance wavelength to the sensing terminal 22. The displacement platform 40 is disposed adjacent to the optical sensor 30 and on the travelling path of the incident light. The displacement platform 40 and the optical sensor 30 are disposed perpendicular to the travel direction of the incident light. The displacement platform 40 is moved to a plurality of different positions corresponding to a plurality of different grating periods, so that the plurality of different positions correspond to different ones of the resonance wavelength of the plurality of different grating periods. The optical spectrum analyzer 50 is coupled to the output terminal 23 to display the spectrum of the reflected light, so that a user can know the resonance wavelength of the reflected light. According to the aforementioned configuration, the position can be distinguished according to different resonance wavelengths, instead of using an optical encoder and the incident light with a specific phase; furthermore, the optical displacement sensing system of the present invention can sense the micrometer-scale displacement between the positions. Moreover, the components of the optical displacement sensing system of the present invention can be obtained easily at low-cost, and the system size of the optical displacement sensing system of the present invention is smaller than that of the conventional optical displacement sensing system. The optical displacement sensing system of the present invention has the advantage of not being sensitive to electromagnetic interferences.

It should be noted that the optical displacement sensing system of the present invention can be applied to a mobile object or device, and it is not necessary to use the displacement platform 40 to assist movement for detection. The displacement platform 40 is merely used to assist the movement of the optical sensor 30, for example, the optical sensor 30 can be disposed on a displacement device with a micrometer scale chip and in cooperation with the components of the optical displacement sensing system of the present invention instead of the displacement platform 40, so as to accurately measure the displacement of the chip.

It should be noted that the optical displacement sensing system of the present invention can perform the resonance of the waveguide grating by the guided-mode resonance principle, and the waveguide grating is constituted of the grating structure and the waveguide. In detail, the configuration of the materials and the grating period of the grating, and the thickness and the number of layers of the waveguide grating allow the incident light with a specific wavelength to be coupled into the waveguide through phase matching provided by the grating structure. Due to the reciprocity, the in-coupled light will be coupled out to into grating structure direction to form the multiple reflected light and into substrate direction to form the multiple transmitted light. The multiple reflected lights create constructive interference with zero-order backward-diffracted light, so that the reflectivity of the reflected light with the specific wavelength is close to 100%, and the multiple transmitted light and the zero-order forward-diffracted light form destructive interference, so that the transmittance of the transmitted light at a specific wavelength is close to zero. Due to the existence of the above phenomenon, an optical filter may be fabricated using this guided-mode resonance principle.

Specifically, a plurality of grating periods $P_1$ to $P_n$ different from each other include a maximal grating period $P_n$ and a minimal grating period $P_1$, the variation from the minimal grating period $P_1$ to the maximal grating period $P_n$ is gradient; for example, the maximal grating period $P_n$ can be 550 nm, the minimal grating period $P_1$ can be 250 nm, and the gradient variation from the minimal grating period $P_1$ to the maximal grating period $P_n$ is 2 nm, and the gradient variation can also be adjusted according to design requirements of the grating structure 32, and the scope of the present invention is not limited to above example. The displacement platform 40 is moved based on a reference point which is the position corresponding to the minimal grating period $P_1$. Since the grating structure 32 has various grating periods $P_1$ to $P_n$, the displacement platform 40 is able to correspond to different grating period while moving, so as to change the resonance wavelength of the reflected light. As a result, compared with the component configuration of the conventional optical displacement sensing system, the optical displacement sensing system of the present invention is simplified and can use the position corresponding to other grating period as the reference point according to the displacement requirement, and the scope of the present invention is not limited to above example.

Furthermore, the optical displacement sensing system of the present invention includes a polarizer 60 disposed between the optical sensor 30 and the sensing terminal 22, and configured to polarize the incident light; preferably, the incident light can be the light in TE mode or TM mode, so that the resonance wavelength generated by the incident light in the TE mode or TM mode can be measured.

It is worth noting that the fiber collimator 20 can be a 2×2 fiber module which has more sensing terminal 22 than the 2×1 fiber module. In this embodiment, the fiber collimator 20 comprises two sensing terminals 22, one of the two sensing terminal 22 is a port for emitting incident light, and the other is a port for receiving the reflected light, so that the incident angle of the incident light can be adjusted, to achieve the purpose that the incident light is obliquely incident on the optical sensor 30 and the reflected light is obliquely reflected to the fiber collimator 20. When the optical sensor 30 is at an oblique position, the displacement measurement can be performed through the 2×2 fiber collimator 20.

Figure 2:
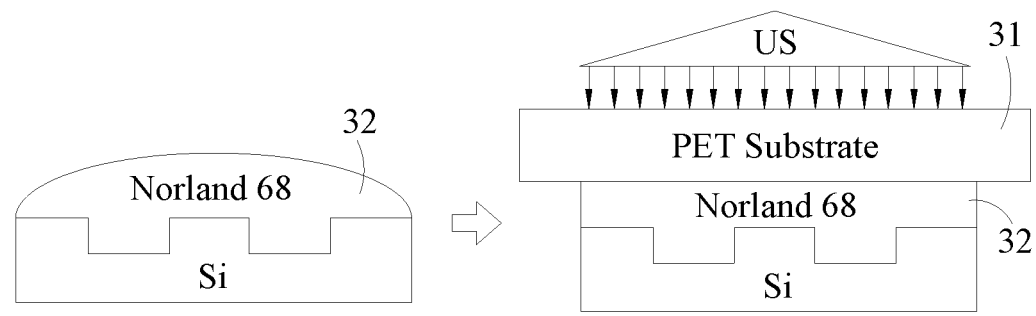
FIG. 2 is a flow of manufacturing an optical sensor of a first embodiment of an optical displacement sensing system of the present invention.
Figure 2:
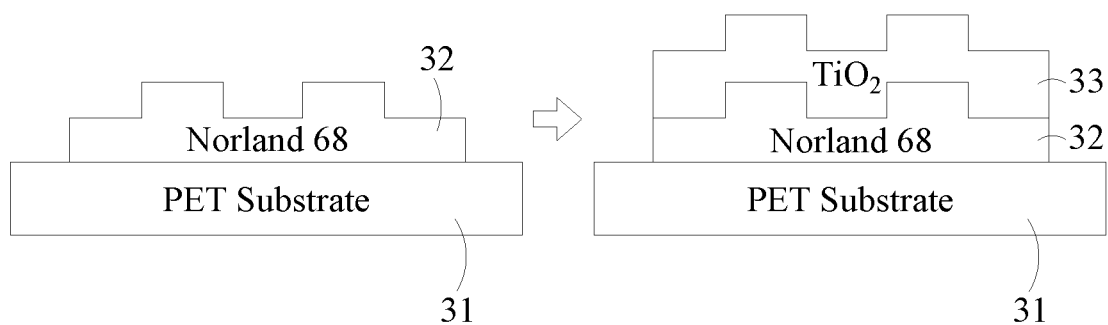
Figure 3:
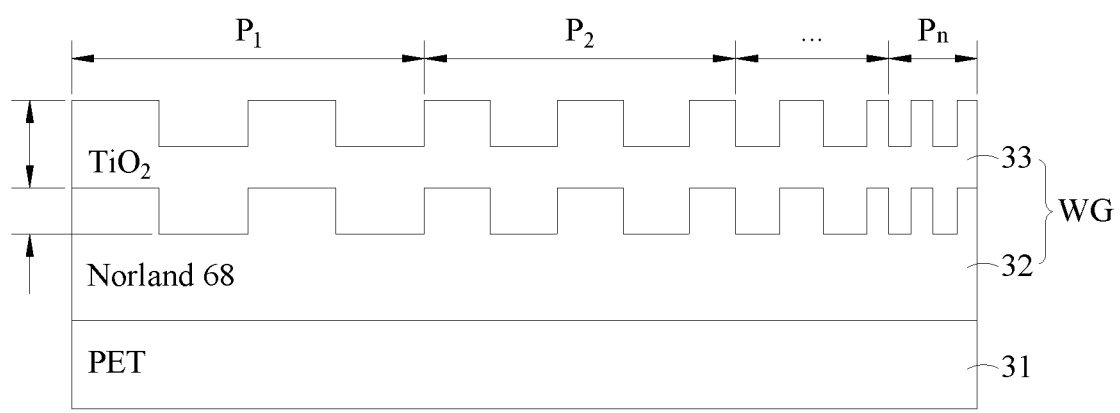
FIG. 3 is a structural diagram of an optical sensor of a first embodiment of an optical displacement sensing system of the present invention.

Please refer to FIGS. 2 and 3, which are flow of manufacturing the optical sensor of the first embodiment of the optical displacement sensing system of the present invention and a structural diagram of an optical sensor of the first embodiment of the optical displacement sensing system of the present invention, respectively. As shown in FIGS. 2 and 3, the substrate 31 is a PET substrate, the grating structure 32 is formed by Norland 68, which is Norland Optical Adhesive 68, and the waveguide layer 33 is formed by $TiO_2$. The flow of manufacturing process of the optical sensor 30 is described as follows. First, Norland68 is applied to the silicon mold which has a structure corresponding to the grating structure 32. Secondly, the PET substrate is disposed on the Norland 68, and the Norland 68 is irradiated with ultraviolet light, so as to cure the Norland68 to form the grating structure 32. Thirdly, the mold turning process is performed to separate the PET substrate having the Norland 68 from the silicon mold. Finally, a $TiO_2$ layer is deposited on the Norland 68 to form a waveguide layer 33, thereby completely forming the optical sensor 30 as shown in FIG. 3. Preferably, the method of depositing the TiO2 layer can include sputtering method, chemical vapor deposition method, pulsed laser deposition method, or molecular beam epitaxy method, and so on, but the scope of the present invention is not limited thereto.

It should be noted that the grating structure 32 can also be formed by first depositing a semiconductor layer, and then performing wet etching or dry etching on the semiconductor layer; however, the scope of the present invention is not limited to above example. The range of the resonance wavelength of the grating structure 32 can be determined according to the grating periods, the material and thickness of the waveguide grating, and the range of the wavelength band of the light source is also determined accordingly. Therefore, the wavelength ranges of the resonance wavelength and the broadband light source 10 are not limited in the present invention.

Figure 4:
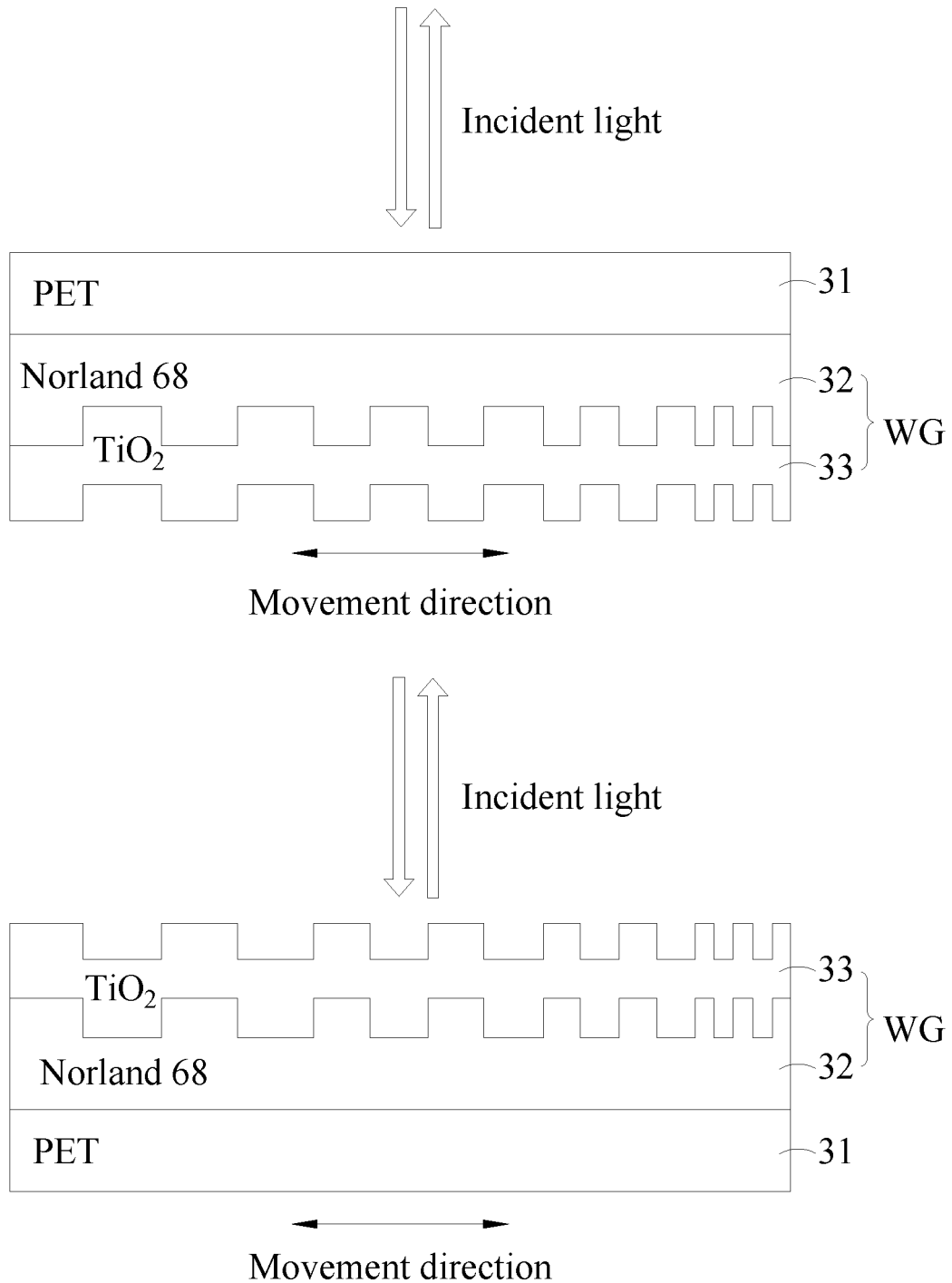
FIG. 4 is a schematic diagram of configurations of an optical sensor of a first embodiment of an optical displacement sensing system of the present invention.

Please refer to FIG. 4, which is a schematic diagram of configurations of an optical sensor of a first embodiment of an optical displacement sensing system of the present invention. As shown in FIG. 4, the incident light can be incident on the substrate 31 and then radiated on the waveguide grating WG to generate the reflected light with the resonance wavelength, and the substrate 31 is located on the side close to the fiber collimator 20; alternatively, the incident light can be incident on the waveguide grating WG and then radiated on the substrate 31 to generate the reflected light with the resonance wavelength, and the substrate is located on the side away from the fiber collimator 20. The aforementioned two configurations can generate the reflected light with the resonance wavelength, thereby achieving the purpose of sensing displacement.

Figure 5:
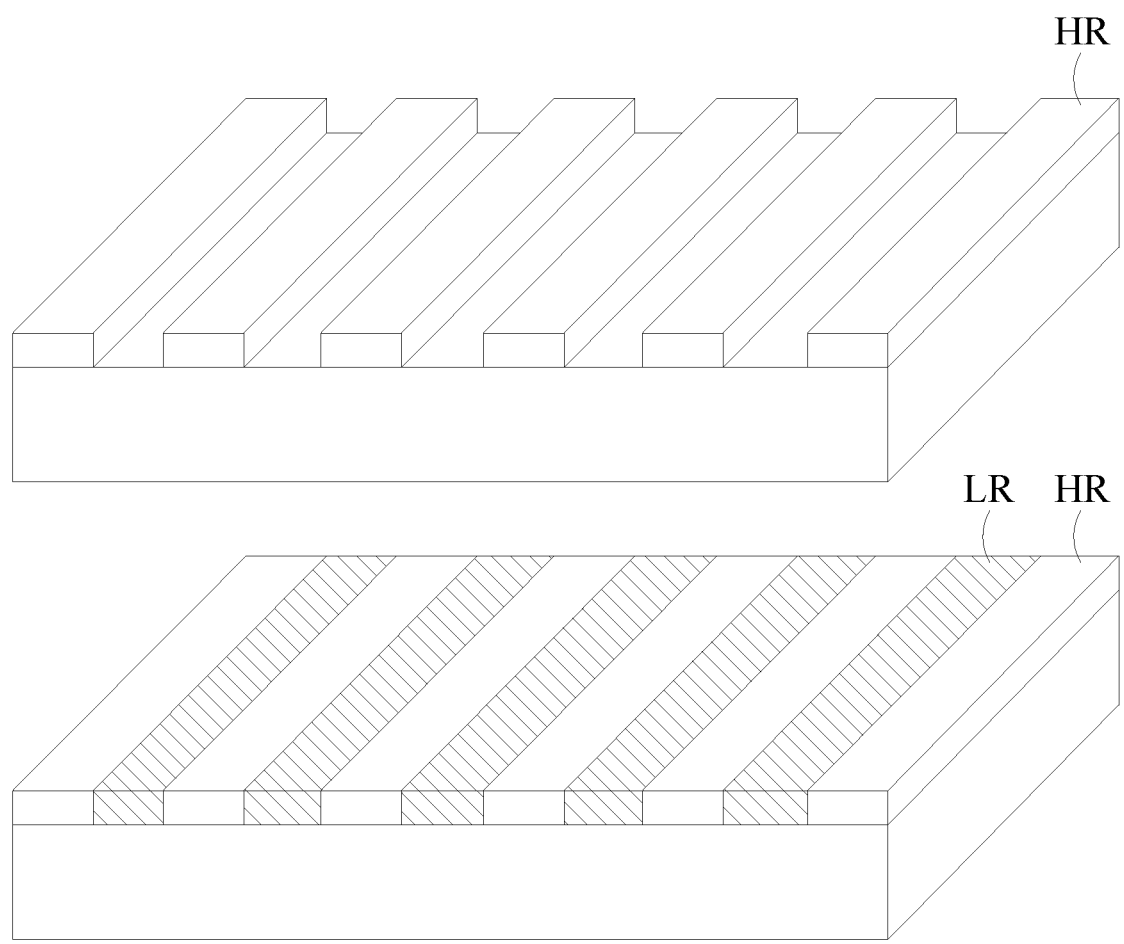
FIG. 5 is an alternative structure diagram of a waveguide grating of a first embodiment of an optical displacement sensing system of the present invention.

Please refer to FIG. 5, which is an alternative structural diagram of the waveguide grating of the first embodiment of the optical displacement sensing system of the present invention. As shown in FIG. 5, the waveguide grating WG is in a single-layer structure and formed by a plurality of first refractive index regions HR and a plurality of second refractive index regions LR disposed alternately. The refractive index of the first refractive index regions is higher than that of the second refractive index of the second refractive index regions. The single first refractive index HR and the single second refractive index region LR can form a grating period. The thicknesses, the material and the period of each first refractive index region HR and each second refractive index region LR may be adjusted according to the requirement in the resonance wavelength, so that the waveguide grating WG may have multiple grating periods $P_1$ to $P_n$ different from each other and is able to reflect the reflected light with the resonance wavelength; furthermore, the numbers of the first refractive index region HR and the second refractive index region LR may be adjusted according to the requirement in displacement amount; however, the scope of the present invention is not limited to above examples. The material of the first refractive index region HR may include tantalum pentoxide ($Ta_2O_5$), niobium pentoxide ($Nb_2O_5$), titanium dioxide ($TiO_2$), zirconium dioxide ($ZrO_2$), hafnium oxide ($HfO_2$) and oxidation Zinc (ZnO); and the material of the second refractive index region LR may include magnesium fluoride ($MgF_2$), cerium oxide ($SiO_2$), calcium fluoride ($CaF_2$), barium fluoride ($BaF_2$) and aluminum oxide ($Al_2O_3$).

Figure 6:
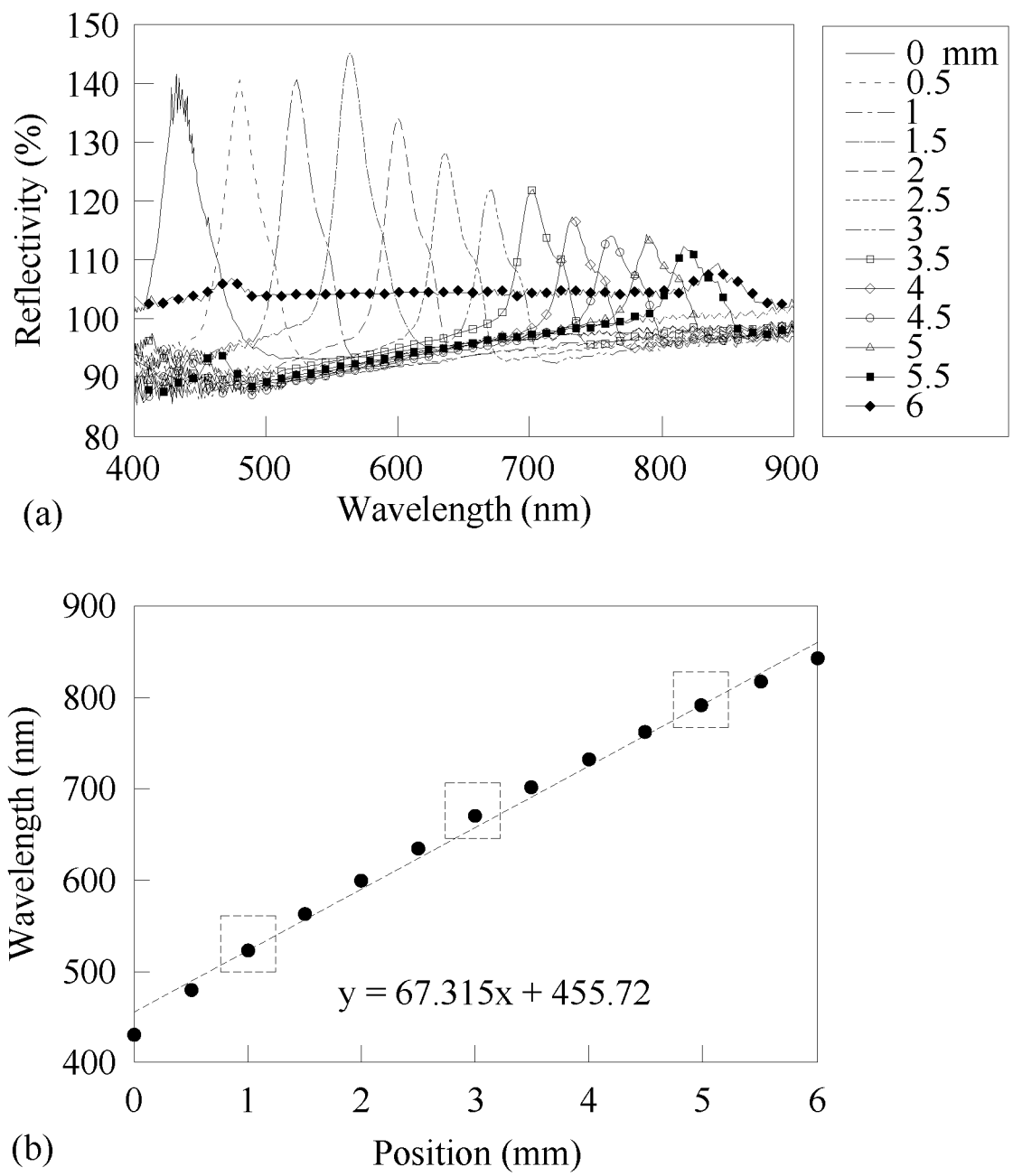
FIG. 6 shows curve diagrams of the light reflection spectrum and wavelength-versus-position of a first embodiment of an optical displacement sensing system of the present invention.

Please refer to FIG. 6, which show curve diagrams of reflected light spectrum and wavelength-versus-position of the first embodiment of the optical displacement sensing system of the present invention. As shown in the part (a) of FIG. 6, the displacement platform 40 starts from the reference point at 0 mm and moves by 0.5 mm, a position is set every 0.5 mm, that is, the displacement is 0.5 mm, and the position at 6 mm is set as the last movement point. Since each position corresponds to different grating period, each position corresponds to the different period, and the wavelengths with the highest reflectivity of each positions are different from each other that is, the resonance wavelengths of the positions are not the same. The resonance wavelengths of all positions are shown in the part (b) of FIG. 6. The resonance wavelengths are not linear with the displacements, but the relationship between the resonance wavelength and the displacement can be linearly fitted as a straight line of y=67.315x+455.72, wherein y is the resonance wavelength and x is the position, and a slope value of the straight line is the sensitivity, and it can be found that an average sensitivity of the optical displacement sensing system of the present invention is 67.315 nm/mm.

Figure 7:
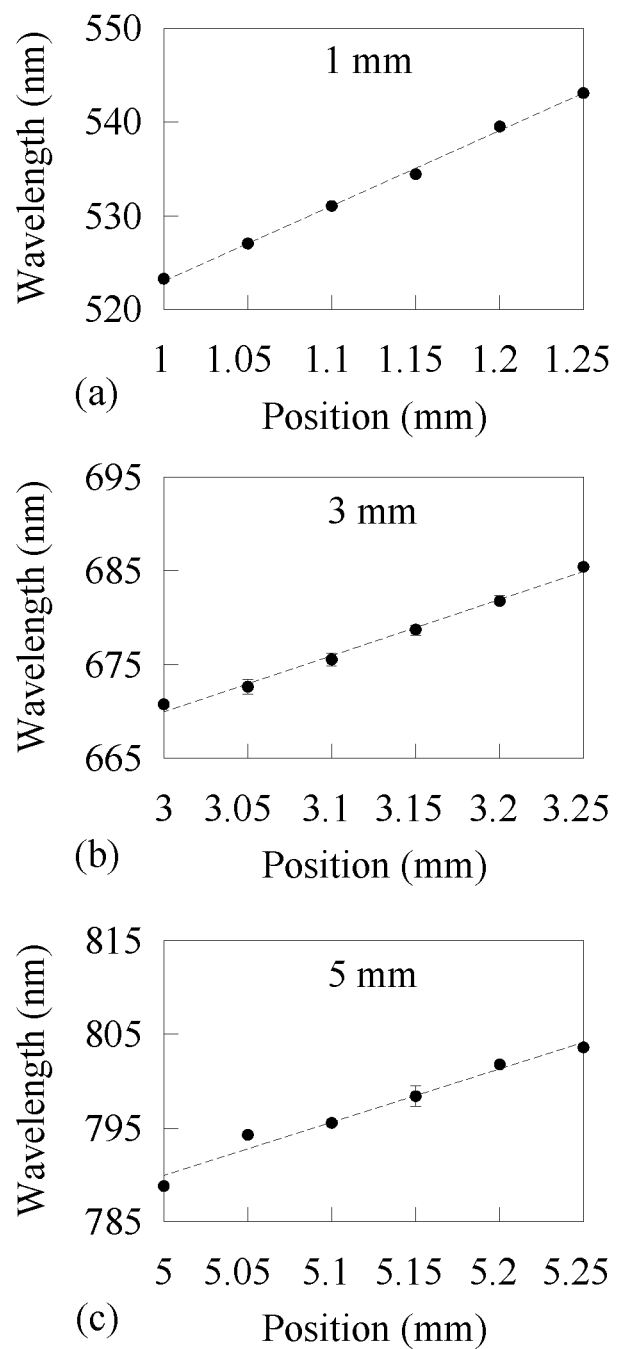
FIG. 7 shows wavelength-versus-position curve diagrams of a first embodiment of an optical displacement sensing system of the present invention.

Please refer to FIG. 7, which shows wavelength-versus-position diagrams of the first embodiment of the optical displacement sensing system of the present invention. In the parts (a), (b), and (c) of FIG. 7, the positions at 1 mm, 3 mm and 5 mm are set as the reference points, respectively, and displacement is 0.05 mm. The linear fitting operation is also performed on the data, it can be found that the sensitivity is 80.2 nm/mm, 59.5 nm/mm and 56.8 nm/mm in the parts (a), (b), and (c) of FIG. 7, respectively. In summary, the grating period corresponding to the position at 1 mm is less than the grating period corresponding to grating period of the position at 5 mm, so that the sensitivity corresponding to the position at 1 mm is higher than the sensitivity corresponding to the position at 5 mm.

Figure 8:
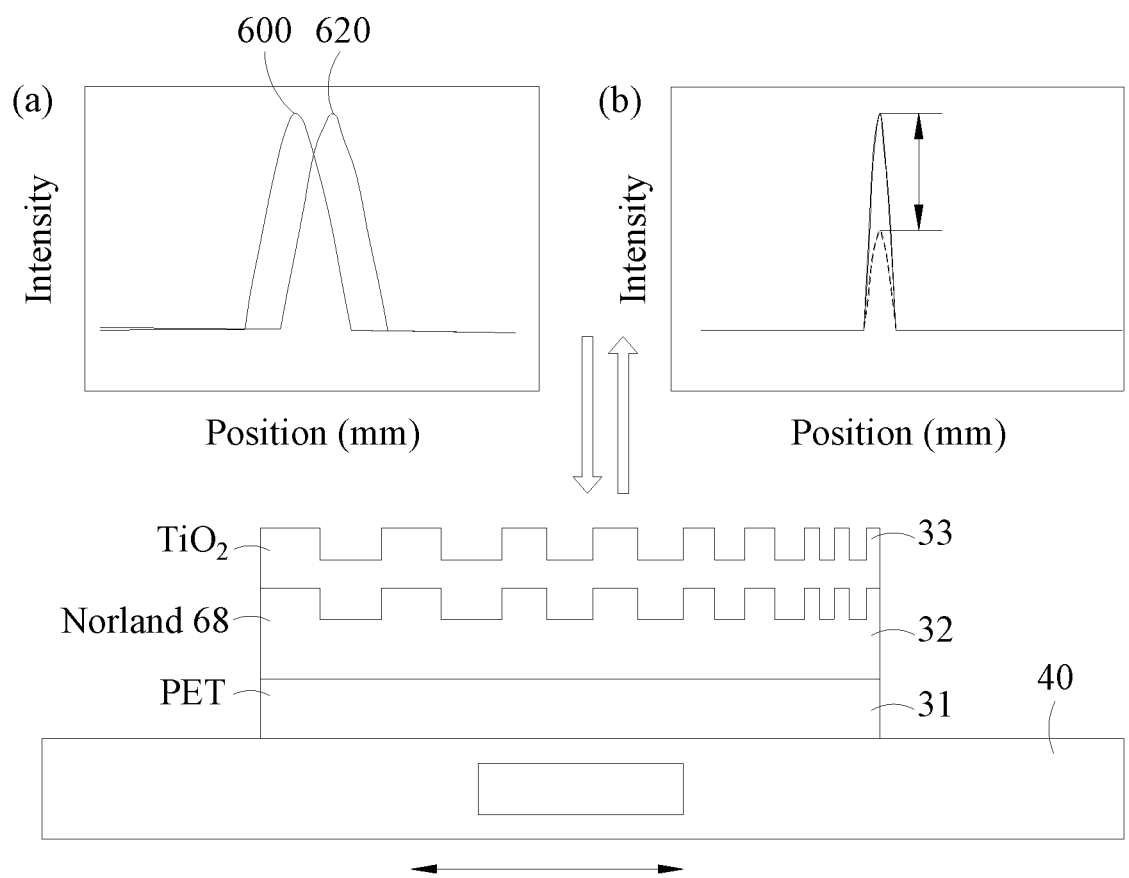
FIG. 8 is a configuration diagram of a first embodiment of an optical displacement sensing system using single wavelength, according to the present invention.

Please refer to FIG. 8, which is the first embodiment of the optical displacement sensing system of the present invention using a light source of single wavelength. As shown in FIG. 8, the incident light has a single wavelength of 600 nm, and is incident on the position of the displacement platform 40 corresponding to the resonance wavelength of 600 nm through the sensing terminal 22 and the position of the displacement platform 40 corresponding to the resonance wavelength of 620 nm, respectively. The grating period corresponding to the resonance wavelength of 600 nm is different from the grating period corresponding to the resonance wavelength of 620 nm, so that the resonance effect of the grating period corresponding to the resonance wavelength of 600 nm is different from the resonance effect of the grating period corresponding to resonance wavelength of 620 nm. The light intensity of the position corresponding to the resonance wavelength of 600 nm is increased because the wavelength of the incident light matches the resonance wavelength of this position, and the light intensity of the position corresponding to the resonance wavelength of 620 nm is decreased because the wavelength of the incident light is different from that of this position. According to the above description, the resonance effect of the single-wavelength light may increase at the position corresponding to the resonance wavelength the same as that of the single-wavelength light, so that the intensity of such position corresponding to the resonance wavelength is enhanced; the resonance effect of the single-wavelength light may be decreased at the positional point not corresponding to the resonance wavelength, so that the light intensity of such position is weakened, thereby understanding that the light intensity is correlated with the displacement distance. Therefore, the light with the single wavelength may be utilized and the position corresponding to the single-wavelength light may be set as the reference point, and the displacement between the reference point and other position may be determined according to the light intensity.

Figure 9:
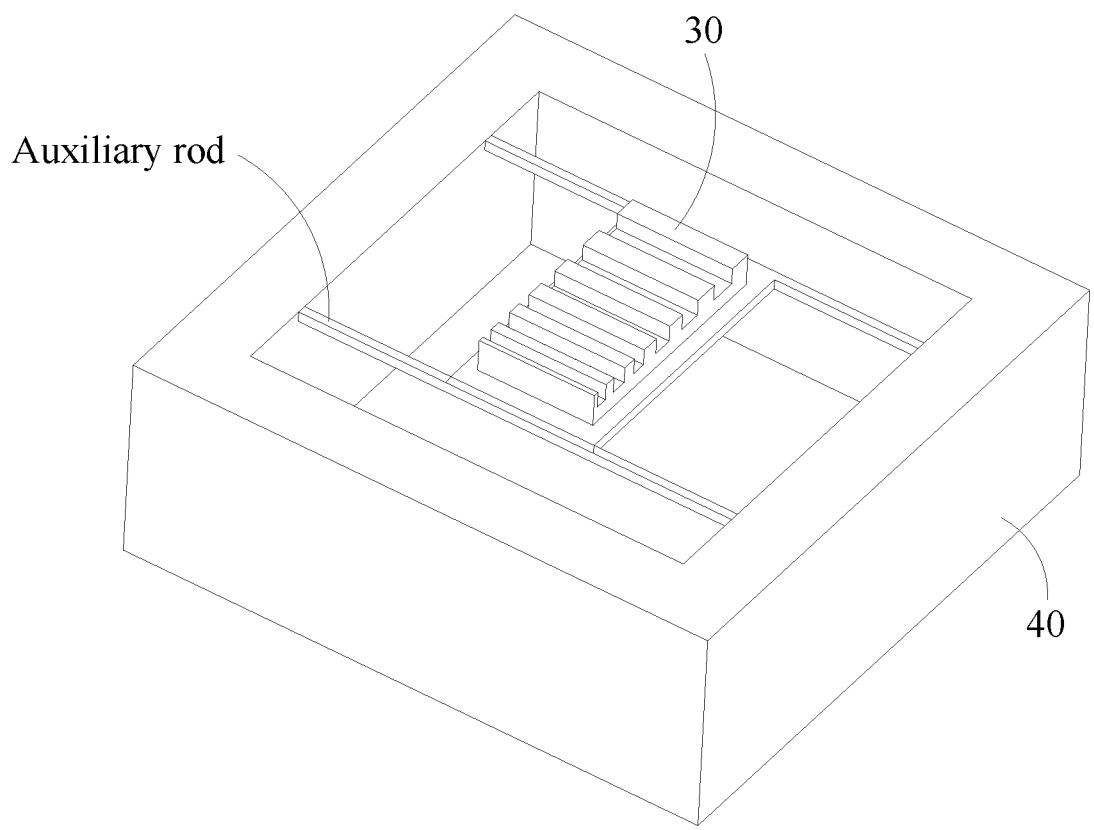
FIG. 9 is a configuration diagram of a first embodiment of an optical displacement sensing system applied to measure an acceleration, according to the present invention.

Please refer to FIG. 9, which is a configuration diagram of the first embodiment of the optical displacement sensing system of the present invention applied to measure acceleration. As shown in FIG. 9, when the displacement platform 40 accelerates, the optical sensor 30, which is suspended by auxiliary rods, can be moved on a direction opposite to the acceleration direction of the displacement platform 40 due to inertia principle. The incident light is incident on different grating periods of the waveguide grating 40 before and after acceleration of the displacement platform 40, respectively, so that the resonance wavelengths of the incident light are different before and after acceleration of the displacement platform 40, respectively, and the displacement can be determined according to the difference of resonance wavelength, and the acceleration can be estimated according to the displacement and a time difference.

Figure 10:
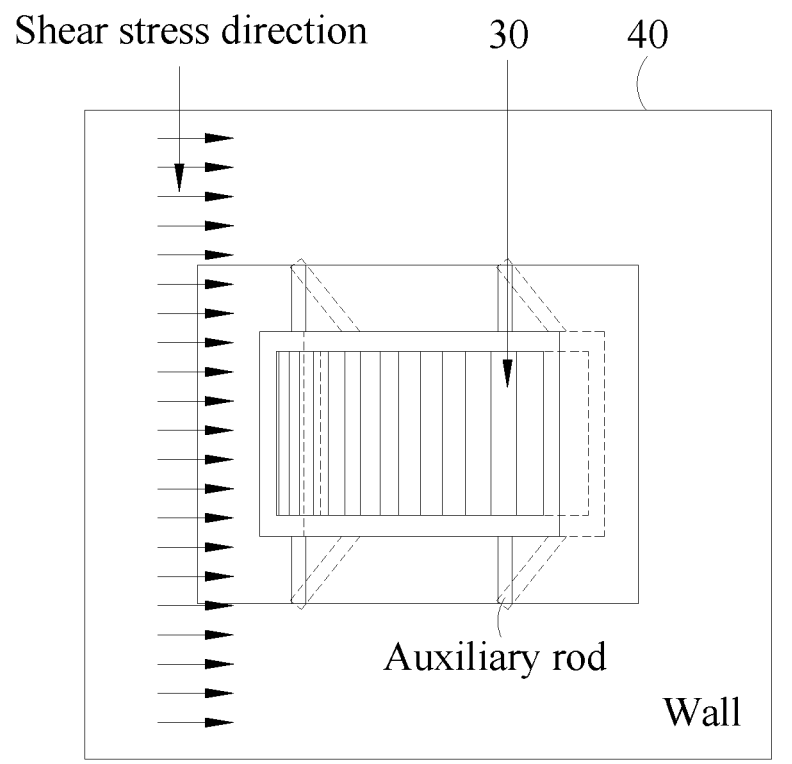
FIG. 10 is a configuration diagram of a first embodiment of an optical displacement sensing system applied to measure shear stress, according to the present invention.
Figure 10:
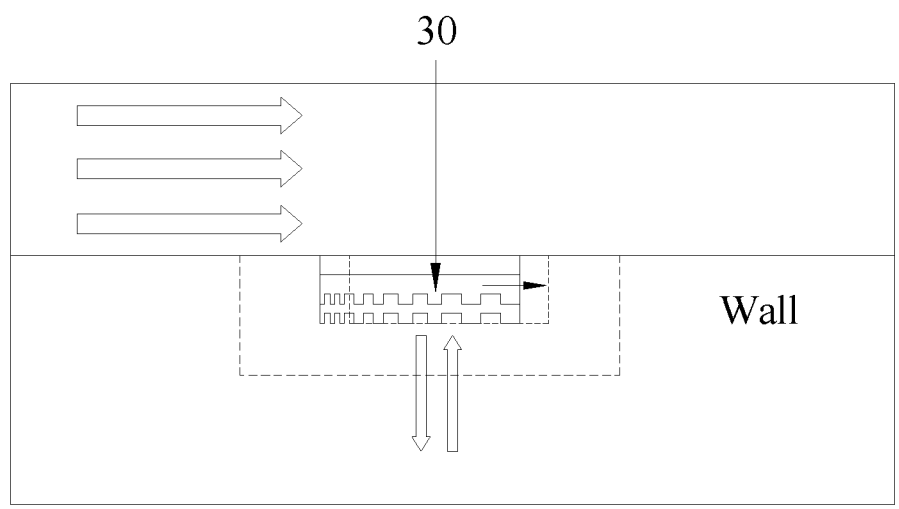

Please refer to FIG. 10, which is a configuration diagram of a first embodiment of the optical displacement sensing system applied to measure shear stress, according to the present invention. As shown in FIG. 10, the optical sensor 30 is set at the hollow part of the displacement platform 40, the optical sensor 30 is suspended by auxiliary rods. When the displacement platform 40 is subjected to the shear stress, the optical sensor 30 can be moved, and the incident light is incident on different grating periods of the waveguide grating WG before and after the displacement platform 40 is subjected to the shear stress, and it causes different resonance wavelengths of incident light before and after the displacement platform 40 is subjected to the shear stress, so that the displacement can be obtained according to the difference in the resonance wavelengths, and a value of the shear stress can be obtained according to a shear stress formula and the displacement.

Figure 11:
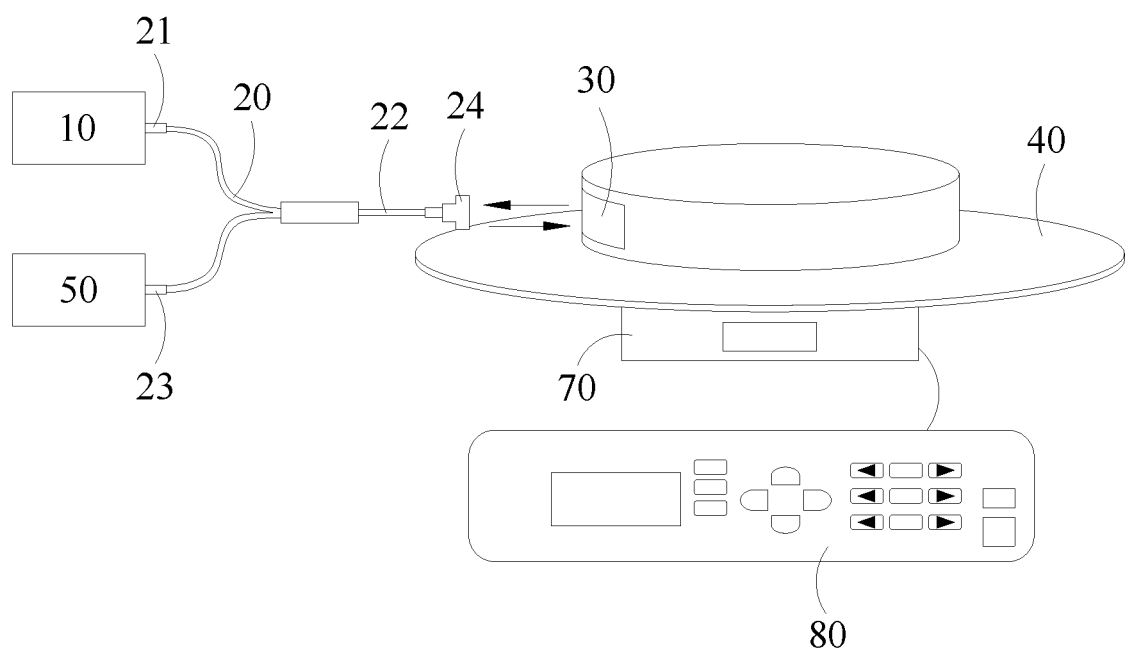
FIG. 11 is a configuration diagram of a second embodiment of an optical displacement sensing system of the present invention.

Please refer to FIG. 11, which is a configuration diagram of a second embodiment of optical displacement sensing system of the present invention. As shown in FIG. 11, the difference between the second embodiment and the first embodiment is in the displacement platform 40, which is a rotary displacement platform in the second embodiment, and the configuration of the transducer 70 and the controller 80. The other components of the second embodiment are the same as that of the first embodiment, so the detailed descriptions are not repeated herein. In detail, the optical sensor 30 is disposed on a cylinder, and the cylinder with the optical sensor 30 is connected to a rotary disc, and the transducer 70 is set below the rotary disc. The transducer 70 and the controller 80 are electrically connected to each other, and configured to rotate the displacement platform 40.

When the controller 80 sends a control command to the transducer 70, the transducer 70 rotates the displacement platform 40 according to the control command, and the grating period of the waveguide grating WG on which the incident light is incident is also changed, so that the position of the resonance wavelength is changed according to the different grating periods of the waveguide grating WG.

Furthermore, the optical displacement sensing system of the present invention can be applied to a rotary object, and it does not necessarily require the transducer 70, the controller 80 and the displacement platform 40 to assist rotation of the optical sensor 30 for detection; the transducer 70, the controller 80 and the displacement platform 40 are used to only assist the rotation of the optical sensor 30. For example, the optical displacement sensing system of the present invention can be applied to a motor, and the motor can be in cooperation with the components of the optical displacement sensing system of the present invention instead of the displacement platform 40, so that a rotation angle and an operational state of the motor can be accurately measured.

Figure 12:
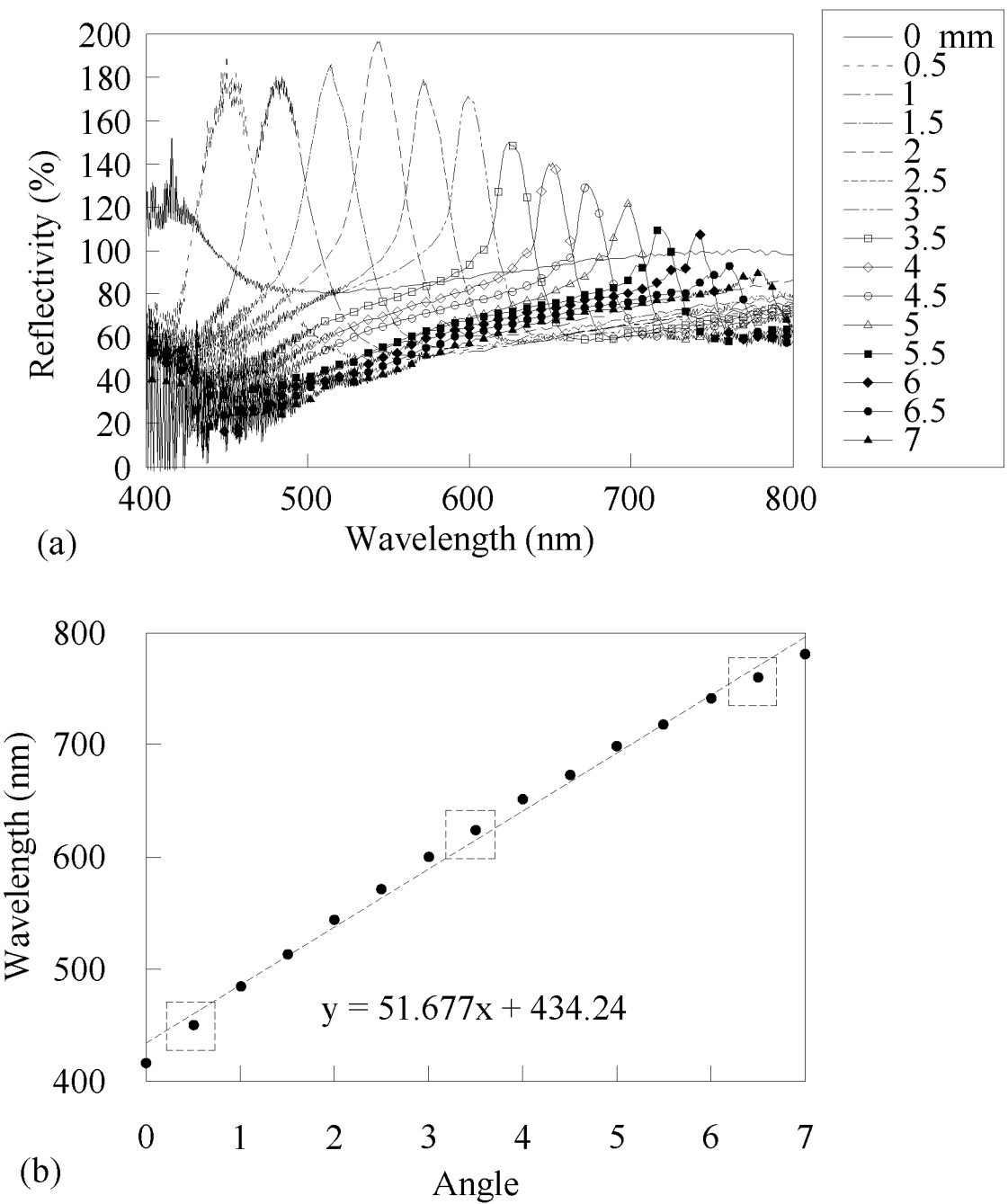
FIG. 12 shows curve diagrams of the light reflection spectrum and wavelength-versus-angle of a second embodiment of an optical displacement sensing system of the present invention.

Please refer to FIG. 12, which shows curve diagrams of reflected light spectrum and wavelength-versus-position of a second embodiment of an optical displacement sensing system of the present invention. As shown in the part (a) of FIG. 12, the displacement platform 40 starts from the reference point at 0 degrees and is moved by 0.5 degrees, a position is set every 0.5 degrees, that is, the displacement is 0.5 degrees, and the final movement position is set at 7 degrees. Each position corresponds to different grating period, and it causes that the wavelength of the highest reflectivity corresponding to each position is different, so that the resonance wavelengths of all positions are different from each other, and resonance wavelengths of all positions are shown in part (b) of FIG. 12. The resonance wavelengths are not linear with the displacements, but the relationship between the resonance wavelength and the displacement can be linearly fitted as a straight line: y=51.677x+434.24, wherein y is resonance wavelength and x is the position, and a slope value of the straight line is a sensitivity, and an average sensitivity of the second embodiment of the optical displacement sensing system of the present invention is 51.677 nm/degree.

Figure 13:
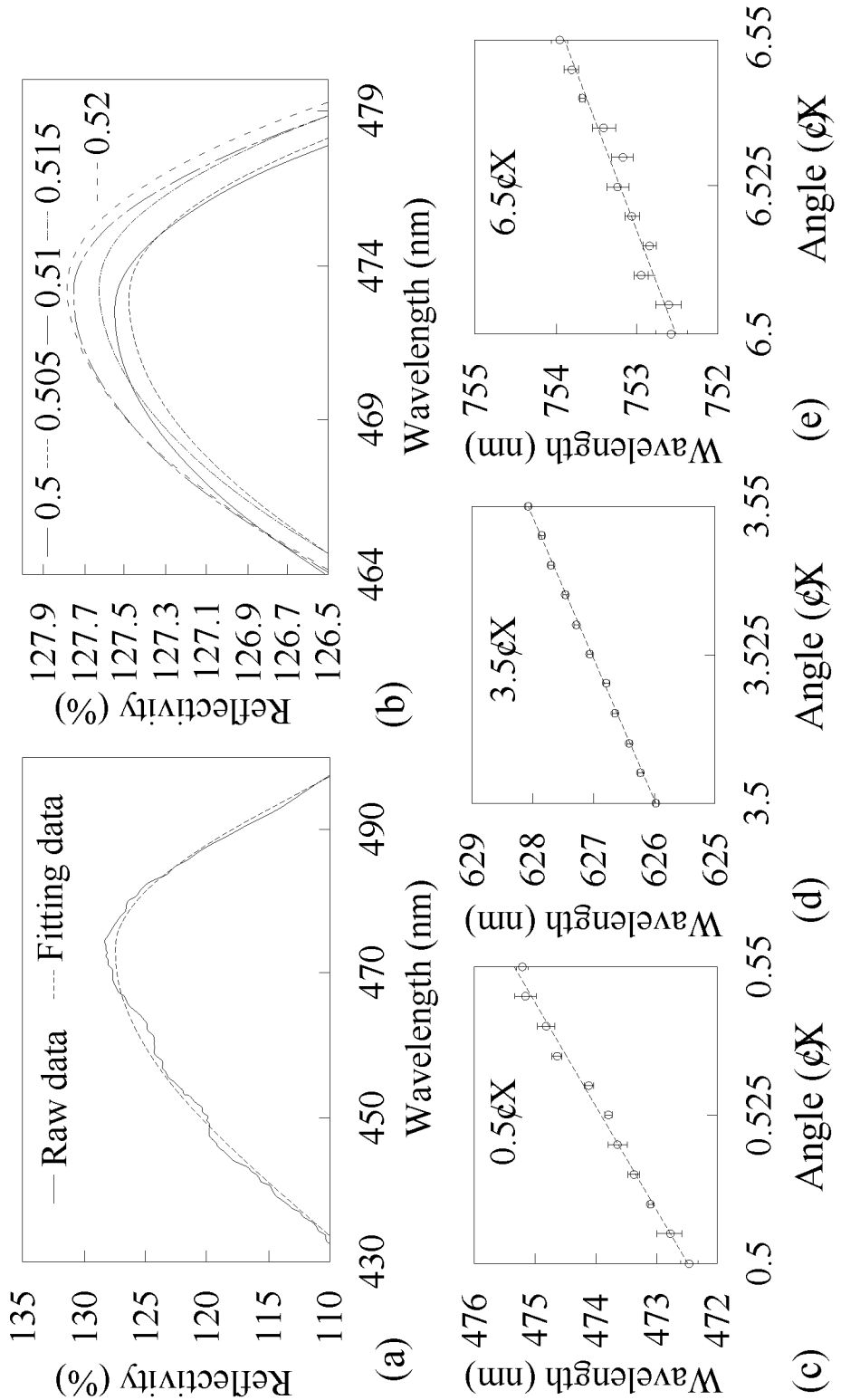
FIG. 13 shows curve diagrams of the light reflection spectrum and wavelength-versus-angle of a second embodiment of an optical displacement sensing system of the present invention.

Please refer to FIG. 13, which show curve diagrams of reflected light spectrum and wavelength-versus-position of the second embodiment of the optical displacement sensing system of the present invention. As shown in part (a) of FIG. 13, the reflectance curve at positional point with 0.5 degrees can be fitted, through an appropriate curve (e.g. Gaussian) of the computer, as a smoothed reflectivity curve. As shown in part (b) of FIG. 13, the position at 0.5 degree is set as a starting point, and the displacement is 0.005 degrees, and five smooth reflectance curves can be fitted by using the Gaussian curve of the computer.

As shown in the parts (c), (d), and (e) of FIG. 13, the positions at 0.5 degrees, 3.5 degrees, and 6.5 degrees are set as reference points, respectively, and the displacement is 0.005 degrees, the linear fitting is also performed to obtain the sensitivities of 57 nm/degree, 41.8 nm/degree and 27.5 nm/degree, respectively. In summary, the grating period corresponding to the position of 0.5 degrees is less than the grating period corresponding to the position of 6.5 degrees, so that the sensitivity corresponding to the position of 0.5 degree is higher than the sensitivity of the position of 6.5 degrees.

Figure 14:
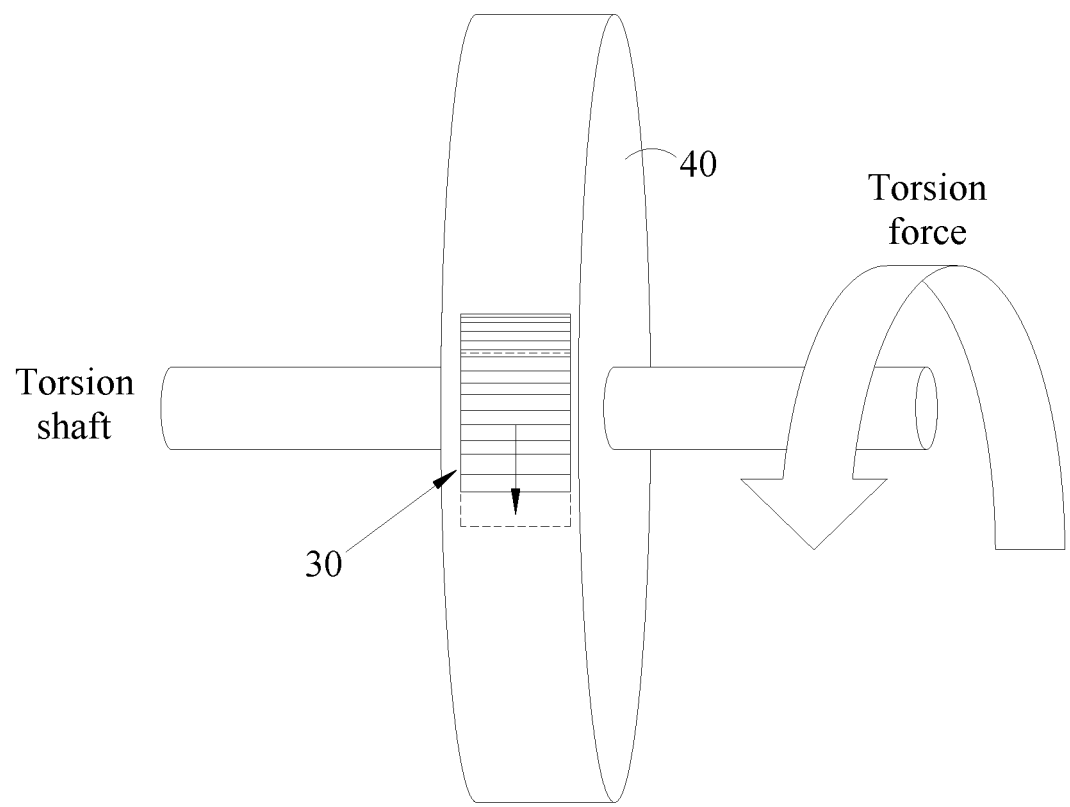
FIG. 14 is a configuration diagram of a second embodiment of an optical displacement sensing system applied to sense torsion, according to the present invention.

Please refer to FIG. 14, which is a configuration diagram of a second embodiment of the optical displacement sensing system applied to sense a torsion force, according to the present invention. As shown in FIG. 14, when a torsion force is applied to a torsion shaft, the displacement platform 40 is rotated and the optical sensor 30 disposed on the displacement platform 40 is also rotated, so that the grating periods of the waveguide grating on which the incident light is incident are different before and after the displacement platform 40 is subjected to the torsion force, respectively. Therefore, the resonance wavelength before the displacement platform 40 subjected to the torsion is different from the resonance wavelength after the displacement platform 40 is subjected to the torsion, and the displacement can be obtained according to the difference of the resonance wavelengths, and the value of the torsion can be obtained according to a torsional formula and the displacement.

Figure 15:
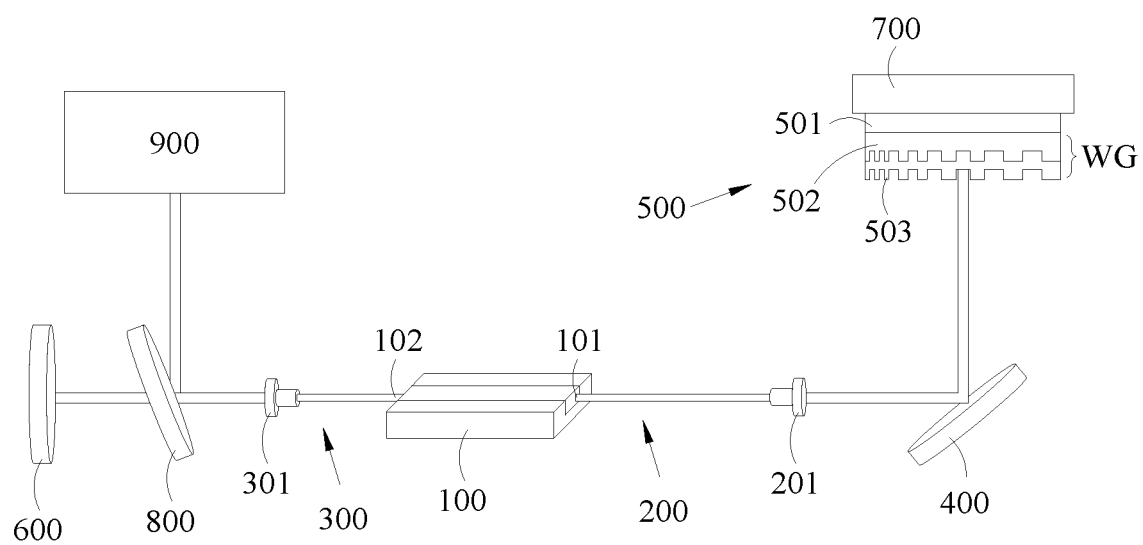
FIG. 15 is a configuration diagram of a third embodiment of an optical displacement sensing system of the present invention.

Please refer to FIG. 15, which is a configuration diagram of a third embodiment of an optical displacement sensing system of the present invention. In the third embodiment, the optical displacement sensing system of the present invention includes an optical amplifier 100, a first fiber collimator 200, a second fiber collimator 300, an incident mirror 400, an optical sensor 500, a reflector 600 and a displacement platform 700. The optical amplifier 100 may be a semiconductor optical amplifier and include an incident terminal 101 and a reflection terminal 102, and the incident light is emitted from the incident terminal 101. The first fiber collimator 200 may include a single mode fiber and a first collimator 201, the first collimator 201 is coupled to the incident terminal 101 through the single mode fiber. The second fiber collimator 300 can include a single mode fiber and a second collimator 301, and the second collimator 301 is coupled to the reflection terminal 102 through the single mode fiber. The incident mirror 400 is disposed on a side of first fiber collimator 200 opposite to the incident terminal 101, and configured to change the direction of the incident light. The optical sensor 500 is disposed adjacent to the incident mirror 400 and disposed on the travelling path of the incident light to receive the incident light. The optical sensor 500 includes a substrate 501 and a waveguide grating WG. The waveguide grating WG comprises a waveguide layer 503 and a grating structure 502. The grating structure 502 has a plurality of grating periods $P_1$ to $P_n$ different from each other, and is disposed on the substrate 501. The waveguide layer 503 is disposed on the grating structure 502. By receiving the incident light by the waveguide grating WG, the waveguide grating WG can reflect a reflected light to the incident mirror 400, and the incident mirror 400 reflects the reflected light to the first fiber collimator 200. The reflector 600 is disposed on a side of the second fiber collimator 300 opposite to reflection terminal 102, and configured to receive the reflected light from the second fiber collimator 300 and reflect the reflected light back to the second fiber collimator 300, so that the reflected light can enter the optical sensor 500. As result, the reflected light can travel back and forth between the optical sensor 500 and the reflector 600 to achieve the laser condition, so as to generate a laser beam. The displacement platform 700 is disposed adjacent to the optical sensor 500 and on the travelling path of incident light. When the laser beam is incident on the incident mirror 400 through the first fiber collimator 200, the laser beam is incident on the optical sensor 500, and the grating structure 502 of the optical sensor 500 is resonated by the laser beam and reflect the reflected laser beam with the resonance wavelength. Hence, when the displacement platform 700 is moved to a plurality of different positions corresponding to a plurality of different grating periods, the plurality of different positions correspond to different ones of the resonance wavelength of the plurality of different grating periods. Since the coherence of the laser beam and the configuration of the grating structure 502 with the multiple grating periods, each of the plurality of different resonance wavelengths correspond to a plurality of different positions respectively, and the full width half maximum of each resonance wavelength is quite narrow, so that each position may be distinguished very easily, and the nanometer-scale displacement between positions can be sensed.

It should be noted that the optical sensor 500 and the reflector 600 can form a resonant cavity, and the reflected light is reflected back and forth in the resonant cavity. At the same time, the resonance wavelength occurs when the reflected light enters the grating structure 502, and with the current control of the optical amplifier 100, the intensity of the resonance wavelength of the reflected light can be enhanced and the full width half maximum of the reflected light can be narrowed. When the reflected light achieves the lasing condition that the optical gain is greater than the loss, the laser beam with a very narrow full width half maximum is formed.

It should be noted that the optical sensor 500 of the third embodiment is the same as the optical sensor 30 of the first embodiment, the plurality of different grating periods $P_1$ to $P_n$ include a maximal grating period $P_n$ and a minimal grating period $P_1$, the variation from the minimal grating period $P_1$ to the maximal grating period $P_n$ is gradient, for example, the maximal grating period $P_n$ may be 550 nm, the minimal grating period $P_1$ may be 250 nm, the variation gradient from the minimal grating period P1 to the maximal grating period $P_n$ may be 2 nm, and the gradient variation may be adjusted according to the design requirements of grating structure 502, and the scope of the present invention is not limited to above example. The displacement platform 700 is moved based on a reference point which is the position corresponding to the minimal grating period P1, and since the grating structure 502 has various grating periods $P_1$ to $P_n$, the displacement platform 700 can correspond to different grating period while moving, so as to make the resonance wavelength of the reflected light vary. Compared with the component configuration of the conventional optical displacement sensing system, the component configuration of the optical displacement sensing system of the present invention is more simple, and other the position corresponding to other grating period may be used as the reference point according to displacement requirement, and the scope of the present invention is not limited to above example.

Furthermore, the optical displacement sensing system of the present invention may include a beam splitter 800 and an optical spectrum analyzer 900. The beam splitter 800 is located between the reflector 600 and the second fiber collimator 300, and configured to split a laser beam, and the beam splitter 800 can make the reflected laser beam emit to the optical spectrum analyzer 900, so that the spectrum of the reflected laser beam can be observed.

It is worth noting that with the resonant cavity formed by the optical sensor 500 and the reflector 600 and the current control scheme of the optical amplifier 100, the intensity of the resonance wavelength of reflected laser beam can be enhanced and the full width half maximum of the reflected laser beam can be narrowed, so that the laser beam with a high quality factor can be formed, thereby improving a standard deviation of the resonance wavelength and achieving the goal of sensing the nanometer-scale displacement.

Similarly, the incident light can be first incident on the substrate 501 and then radiated on the waveguide grating WG, to generate the reflected light with the resonance wavelength, and the substrate 501 is located on the side close to the reflector 600; alternatively, the incident light can also be first incident on the waveguide grating WG and then radiated on the substrate 501, to generate the reflected light with the resonance wavelength, and the substrate 501 is located a side away from the reflector 600. The aforementioned two configurations can generate the reflected light with the resonance wavelength, to achieve the purpose of sensing displacement.

Furthermore, in the embodiment, the waveguide grating WG can also be a single-layer structure, as shown in FIG. 5, and include a plurality of first refractive index regions HR and a plurality of second refractive index regions LR alternately disposed thereon, and single first refractive index HR and single second refractive index region LR can form a grating period, and the thicknesses and materials of each first refractive index region HR and each second refractive index region LR, and grating period can be adjusted according to the requirement in the resonance wavelength. Hereby, the waveguide grating WG have multiple grating periods $P_1$ to $P_n$ different from each other, and can reflect the reflected light with the resonance wavelength. The numbers of the first refractive index regions HR and the second refractive index regions LR can be adjusted according to the requirement in displacement, but the scope of the present invention is not limited to above example. Since the materials of the first refractive index region HR and the second refractive index region LR are described in the first embodiment, so the descriptions are not repeated herein.

According to above contents, the optical displacement sensing system of the present invention can use the configuration of the grating structure 32 having multiple grating periods $P_1$ to $P_n$ different from each other, to make the displacement platform 40 correspond to different grating period while displacement platform 40 is moving, and the resonance wavelengths of the positions are different from each other, so that the displacement can be determined according to the difference between resonance wavelengths, instead of using the optical encoder and the incident light with the specific phase, thereby achieving the purpose of micrometer-scale displacement detection. Furthermore, the optical displacement sensing system of the present invention can be applied to detect angle, acceleration, shear stress and torsion. In summary, the optical displacement sensing system of the present invention can have the advantages as described above, and the required components are easy to obtain and low cost, and the optical displacement sensing system of the present invention can achieve micron-scale displacement detection, and even nano-scale displacement detection.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. An optical displacement sensing system, comprising,
   an optical amplifier comprising an incident terminal and a reflection terminal, and the incident terminal being configured to output an incident light;
   a first fiber collimator coupled to the incident terminal;
   a second fiber collimator coupled to the reflection terminal;
   an incident mirror disposed on a side of the first fiber collimator opposite to the incident terminal, and configured to change a direction of the incident light;
   an optical sensor disposed adjacent to the incident mirror and on a travelling path of the incident light, and configured to receive the incident light, the optical sensor comprising:
   a substrate; and
   a waveguide grating with a plurality of grating periods different from each other and disposed on the substrate, the waveguide grating being configured to receive the incident light and to reflect a reflected light to the incident mirror, and the incident mirror reflecting the reflected light to the first fiber collimator;
   a reflector disposed on a side of the second fiber collimator opposite to the reflection terminal, and configured to receive the reflected light from the second fiber collimator, and reflecting the reflected light to the second fiber collimator, so as to reflect the reflected light to the optical sensor, and make the reflected light travel back and forth between the optical sensor and the reflector to achieve a lasing condition for generating a laser beam; and
   a displacement platform disposed adjacent to the optical sensor and on the travelling path of the incident light;
   wherein when the laser beam is incident on the incident mirror through the first fiber collimator, the laser beam is then incident on the optical sensor, to make the waveguide grating of the optical sensor resonate and reflect the reflected laser beam with a resonance wavelength, and the displacement platform is moved to a plurality of different positions corresponding to a plurality of different grating periods, so that the plurality of different positions correspond to different ones of the resonance wavelength of the plurality of different grating periods.

2. The optical displacement sensing system according to claim 1, wherein the substrate is located on a side away from or close to the incident mirror.

3. The optical displacement sensing system according to claim 1, wherein the waveguide grating comprises a grating structure and a waveguide layer, the grating structure is disposed on the substrate, and the waveguide layer is disposed on the grating structure.

4. The optical displacement sensing system according to claim 1, wherein the waveguide grating comprises a plurality of first refractive index regions and a plurality of second refractive index regions alternately disposed thereon, with the first refractive index regions having a refractive index higher than that of the second refractive index regions.

5. The optical displacement sensing system according to claim 1, wherein a displacement between the positions is in a nanometer scale.

6. The optical displacement sensing system according to claim 1, further comprising a beam splitter and an optical spectrum analyzer, wherein the beam splitter is located between the reflector and the second fiber collimator, the beam splitter redirects the reflected laser beam to the optical spectrum analyzer.

7. The optical displacement sensing system according to claim 1, wherein the plurality of grating periods comprise a maximal grating period and a minimal grating period, a variation from the minimal grating period to the maximal grating period is gradient.

8. The optical displacement sensing system according to claim 7, wherein the displacement platform is moved based on a reference point which is a position corresponding to the minimal grating period.

* * * * *